P. G. MYERS.
SIGNAL DEVICE.
APPLICATION FILED APR. 26, 1920.
1,411,888.
Patented Apr. 4, 1922.
2 SHEETS—SHEET 1.
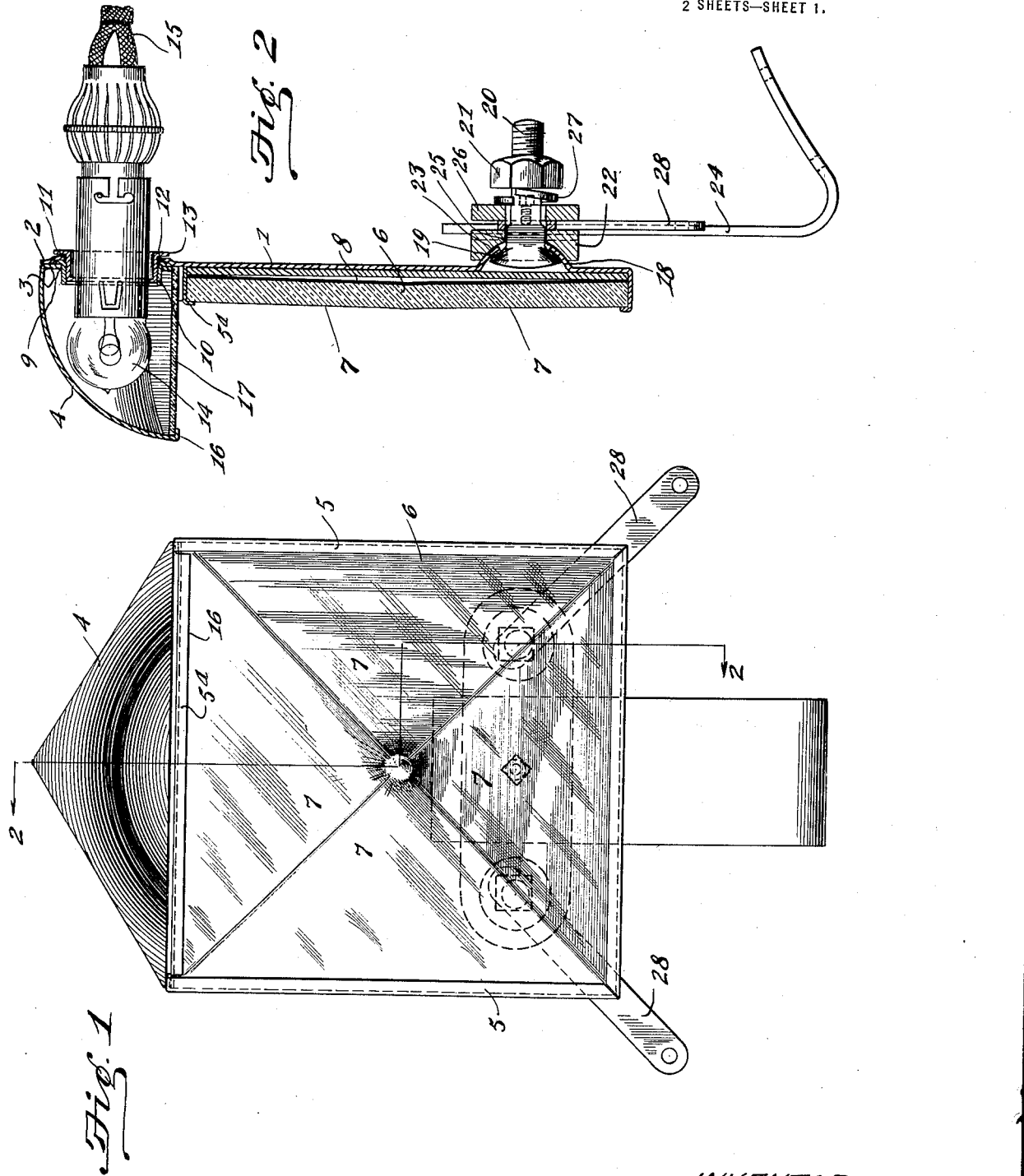
INVENTOR
P. G. Myers
BY Frease, Merkel, Saywell & Bond
ATTYS.

P. G. MYERS.
SIGNAL DEVICE.
APPLICATION FILED APR. 26, 1920.
1,411,888.
Patented Apr. 4, 1922.
2 SHEETS—SHEET 2.
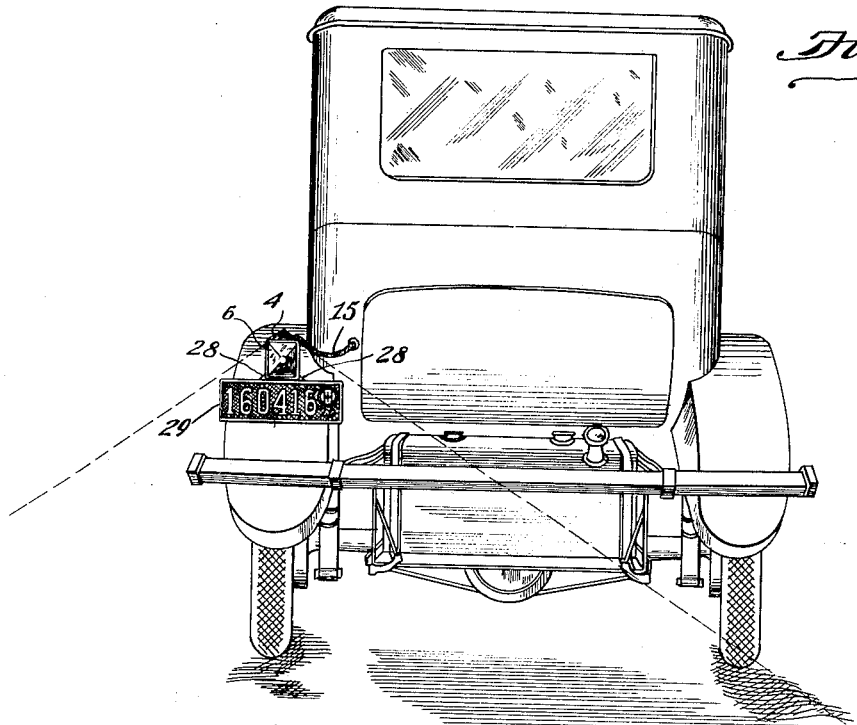
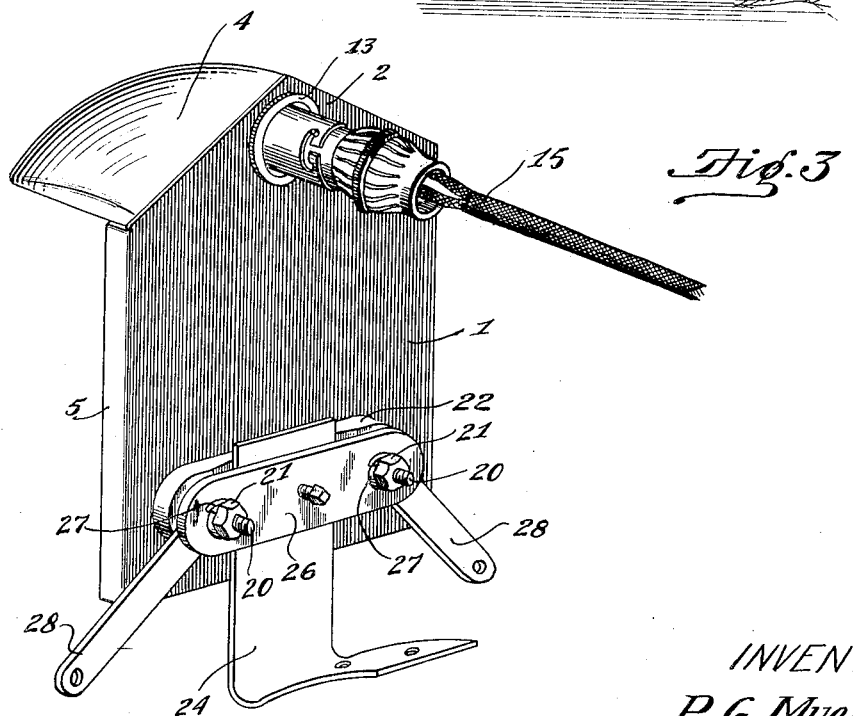
INVENTOR
P. G. Myers
BY Frean, Merkel, Saywell & Bond
ATTYS.

UNITED STATES PATENT OFFICE.

PARKE G. MYERS, OF CAIRO, OHIO, ASSIGNOR TO THE AUTOMATIC SIGNAL & SIGN COMPANY, OF CANTON, OHIO, A CORPORATION OF OHIO.

SIGNAL DEVICE.

1,411,888.  Specification of Letters Patent.  Patented Apr. 4, 1922.

Application filed April 26, 1920. Serial No. 376,674.

*To all whom it may concern:*

Be it known that I, PARKE G. MYERS, a citizen of the United States, residing at Cairo, in the county of Stark and State of Ohio, have invented a new and useful Signal Device, of which the following is a specification.

The invention relates to signaling devices and more particularly to such a device designed to be carried upon the rear end of an automobile or other vehicle, to signal the drivers of other vehicles approaching from the rear.

The object of this invention is to construct a signal device with a permanent light and reflecting surfaces to project the rays from the permanent light.

Another object is to construct a signal device with reflecting surfaces to catch the rays of light thrown from an outside source and to reflect them back in the direction from whence they came.

Another object is to construct a signal device with a permanent light superposed above a plurality of reflecting surfaces, said surfaces being designed to reflect the rays falling from said permanent light, in several directions.

A further object is to construct a signal device provided with a permanent light superposed above a colored reflecting surface, said reflecting surface being designed to reflect the rays falling from said permanent light in a colored ray.

Another object is to construct a signal device of the class described with a bracket designed to permit the signal to be set at various angles in order to get the proper focus.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a front elevation of the signaling device showing the arrangement of the permanent light and the reflecting surfaces.

Fig. 2 is a transverse section on the line 2—2, Fig. 1.

Fig. 3 is a perspective view showing the rear of the signal device; and

Fig. 4 is a rear view of an automobile showing the improved signal device mounted thereon.

A practical embodiment of the invention is disclosed in the accompanying drawings, forming a part of this specification in which similar numerals of reference indicate corresponding parts throughout the several views.

Referring to the accompanying drawings, the back portion 1 of the signal device is preferably formed of sheet steel rectangular in shape and provided with a tapered upper projection 2 against the front face of which the rear wall 3 of the canopy portion 4 is located, said canopy portion having an inclined curved roof as best shown in Figs. 2 and 3.

Secured to the rectangular portion of the back 1 by means of the angular retaining flanges 5 and the metal binding piece 5ª is the reflector plate 6 having a plurality of reflecting surfaces 7 set at angles to each other. This reflector 6 is preferably formed of colored glass, coated upon the rear surface with mercury or the like shown at 8, in the manner of an ordinary mirror.

An aperture 9 is provided in the central portion of the rear wall 3 of the canopy and an inturned internally threaded collar 10 is located through said aperture and is permanently connected to the wall 3 by solder or the like. A similar aperture 11 registering with the aperture 9 is provided in the projection 2 of the back plate 1.

The threaded portion 12 such as is provided upon the ordinary lamp sockets commonly used upon automobiles, is threaded into the inturned collar 10 and an annular flange 13 formed upon the socket is designed to engage the rear side of the portion 2, and thus lock the canopy in position upon the back plate when the socket has been screwed into place.

An ordinary lamp shown at 14 is placed in the socket and renewal of the lamp may be made if the same becomes burnt out by unscrewing the socket from the collar of the canopy and withdrawing the lamp through the apertures 9 and 11.

Current will be furnished to the lamp by means of the wires 15 which are connected to the storage battery usually carried upon automobiles. A bead 16 is formed upon the lower edges of the canopy portion for the purpose of retaining a panel of clear glass 17.

In order to provide adjustment of the signal device to different angles of inclination for a purpose to be hereinafter more fully set forth, a hollow socket portion 18 is formed at each side of the rear of the plate 1 preferably near the lower portion thereof and fitting within each of these hollow sockets is the rounded head 19 of the bolt 20, a nut 21 being provided upon the outer threaded end of each bolt.

A bar 22 provided with depressions 23 to receive the rear side of each socket portion 18, is arranged to engage one side of an ordinary lamp bracket 24 such as is usually carried upon the rear of automobiles for attaching tail lights or license plates. This bar is also provided with apertures 25 by means of which the bar is mounted upon the bolts 20 and a coacting bar 26 is designed to be mounted upon the bolts 20 and to bear against the other side of the bracket 24 and all of these parts are designed to be held in position by tightening the nuts 21 upon the bolts 20, lock washers 27 being provided upon the bolts between the bar 26 and the nuts 21.

A downwardly and angularly disposed arm 28 may be secured upon each of the bolts 20 between the bars 22 and 26 and upon these arms the ordinary license plate 29 may be secured.

Referring to Fig. 2 of the drawings it will be seen that the lamp 14 is so mounted that its rays will fall upon every part of each of the faces 7 of the reflector plate, the rays thus striking upon the reflector plate being reflected backwardly in four different directions as colored rays.

By reason of the peculiarly shaped top 4 of the canopy the direct rays from the lamp 14 will illuminate the license plate hung upon the arms 28 and will also illuminate the roadway in the rear of the vehicle for a considerable space.

In practical use the signal device will be secured upon the ordinary lamp bracket at the rear of the automobile in the manner illustrated and hereinafter described. It will be obvious that by reason of the plurality of inclined faces the indirect rays reflected from the lamp will be distributed over a considerable area in the rear of the car and will thus be visible from practically any point in the rear of the vehicle.

In the event that the rear lamp of the type generally used upon automobiles should become disabled and the driver of the car should not know that the rear light is not burning accidents frequently occur as drivers of cars in the rear will often be unable to distinguish a vehicle moving ahead of them without a light until they have approached too close to avoid accident.

With the use of the present signal device, however, should the lamp within the canopy burn out or otherwise become disabled the rays of light from the headlights of an automobile approaching from the rear will fall upon the reflecting faces of the reflector plate 6 and will be reflected in colored rays back to the driver of the approaching automobile.

Since the location of my signal device upon the rear of automobiles will vary in different makes of cars, and since the headlights upon all automobiles are at practically the same elevation from the roadway the signal will have to be tilted at the proper angle to catch the rays of light and reflect them back to the line or vision of the driver of the approaching vehicle and to accomplish this I provide the adjustable attaching means consisting of the rounded headed bolts 20 and the sockets 18 hereinbefore described.

I claim:

1. In a signal of the character described, a back plate having secured thereto a plurality of reflecting surfaces, a canopy superposed above said reflecting surfaces and having a rear wall lying adjacent the face of said back plate, an inturned internally threaded collar formed integral with the rear wall of said canopy, an aperture in said rear wall registering with said collar and an aperture in the rear plate registering with the said first aperture, a lamp socket having a threaded portion thereon designed to be screwed into the said threaded collar and an annular flange upon said lamp socket designed to engage the rear of said back plate to lock all of said parts together when the socket is screwed into place.

2. A signal of the character described including a convex reflector formed of colored glass and provided with a mirror back, means for connecting the same to the rear of a vehicle, a lamp located at one side of the reflector and arranged to throw a light thereon and a forwardly projecting hood at the outer edge of said reflector enclosing said lamp and arranged to throw the light from said lamp upon the reflector.

3. In a signal of the character described, a back plate, a reflector of shallow, pyramidal form mounted upon said back plate, a forwardly projecting hood at the outer portion of the back plate, said hood being open only upon its under side, and a lamp within said hood arranged to throw a beam of light upon said reflector.

4. In a signal of the character described, a back plate having secured thereto a plurality of reflecting surfaces, a canopy superposed above said reflecting surfaces, the rear wall of said canopy lying adjacent to the face of the back plate, said back plate and rear wall of the canopy having registering apertures and a lamp socket extended through said apertures to hold the canopy in position above the reflecting surfaces.

5. In a signal of the character described, a back plate, a convex colored reflector mounted upon said back plate, a triangular hood mounted upon the back plate above said reflecting surface, a lamp within said hood and means for attaching a license plate beneath the reflecting surface in position to receive the rays of light from said lamp.

In testimony that I claim the above, I have hereunto subscribed my name.

PARKE G. MYERS.